United States Patent [19]

Shinma et al.

[11] Patent Number: 4,573,059
[45] Date of Patent: Feb. 25, 1986

[54] INK DONOR SHEET COLOR DETECTING DEVICE

[75] Inventors: Mitsuru Shinma; Toyohiro Kobayashi; Masahito Mori; Shunji Tsuboi; Masaru Sugita, all of Shizuoka, Japan

[73] Assignee: Mitsubishi Denki Kabushiki Kaisha, Tokyo, Japan

[21] Appl. No.: 706,395

[22] Filed: Feb. 27, 1985

[30] Foreign Application Priority Data

Feb. 29, 1984 [JP] Japan .................................. 59-38204
Mar. 16, 1984 [JP] Japan .................................. 59-51781
Mar. 23, 1984 [JP] Japan .................................. 59-55832
Apr. 27, 1984 [JP] Japan .................................. 59-85520

[51] Int. Cl.$^4$ ............................................. G01D 15/10
[52] U.S. Cl. ............................. 346/76 PH; 400/240.4; 400/120; 346/106; 219/216; 250/548
[58] Field of Search ................ 346/76 PH, 76 R, 106; 400/120, 240, 240.4; 219/216 PH; 250/548, 201, 318; 358/206

[56] References Cited

U.S. PATENT DOCUMENTS 4,113,391  9/1978  Minowa .................. 346/76 PH
4,363,271  12/1982  Host ......................... 250/548
4,399,749  8/1983  Arai ........................... 400/120

FOREIGN PATENT DOCUMENTS 0193184  11/1983  Japan ........................ 400/120

Primary Examiner—E. A. Goldberg
Assistant Examiner—A. Evans
Attorney, Agent, or Firm—Bernard, Rothwell & Brown

[57] ABSTRACT

An ink donor sheet color detecting device is disclosed wherein markers differentiated from each other in shape or in length for individual colors of inks applied to an ink donor sheet are provided at positions on the ink donor sheet corresponding to individual ink areas while a judging means for judging the differentiated shaper or length of a marker is provided in order to to allow distinction of a color of the ink of an ink area corresponding to the marker.

16 Claims, 20 Drawing Figures

FIG. 1 (PRIOR ART)
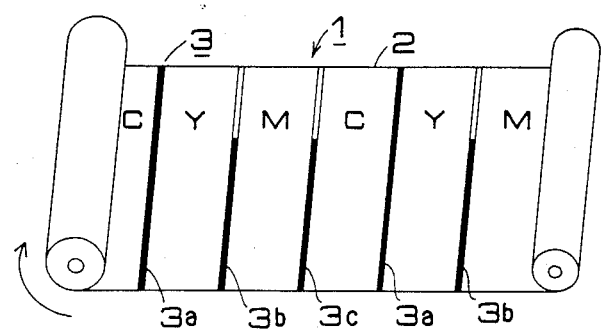
FIG. 2 (PRIOR ART)
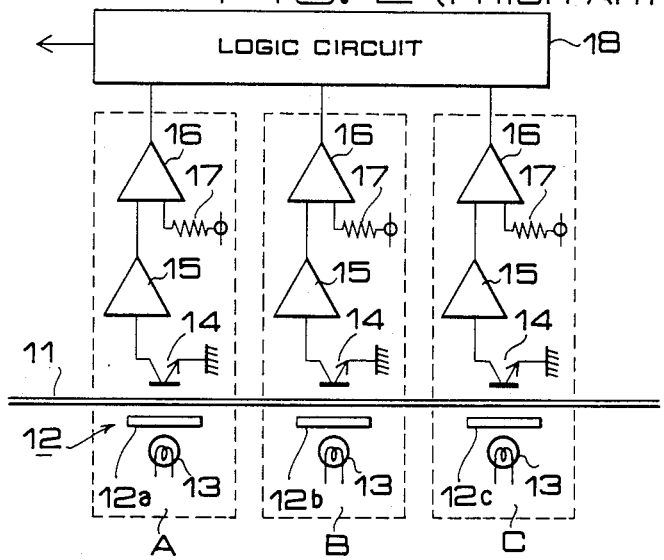
(PRIOR ART) FIG. 3
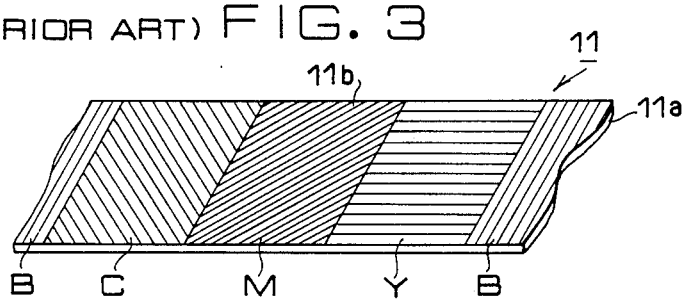

FIG. 11
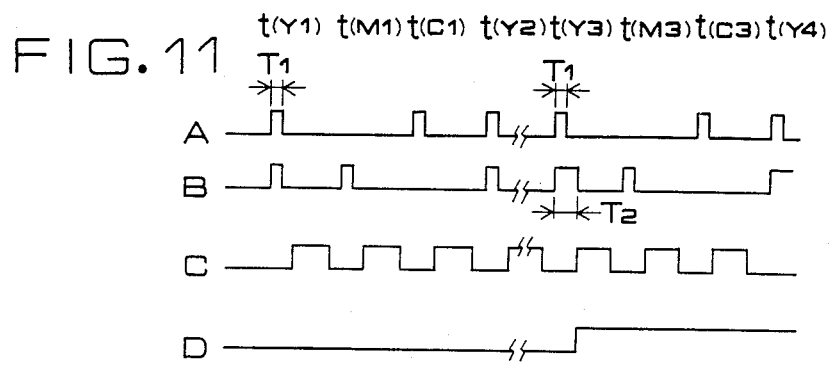
FIG. 12
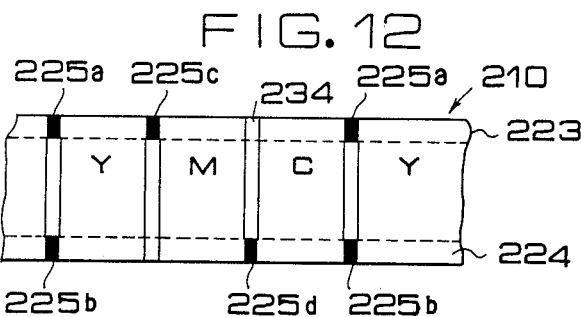
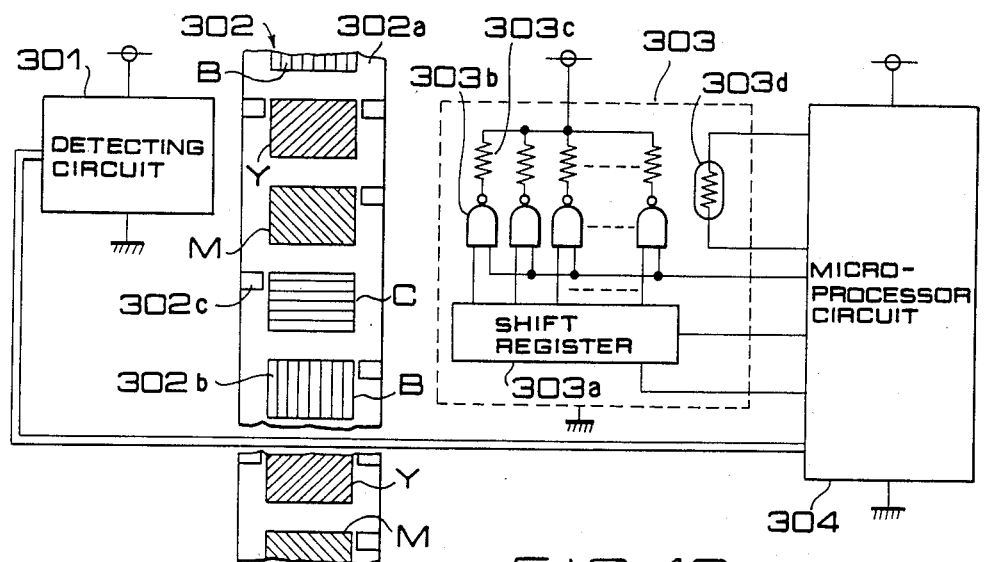
FIG. 13 (PRIOR ART)

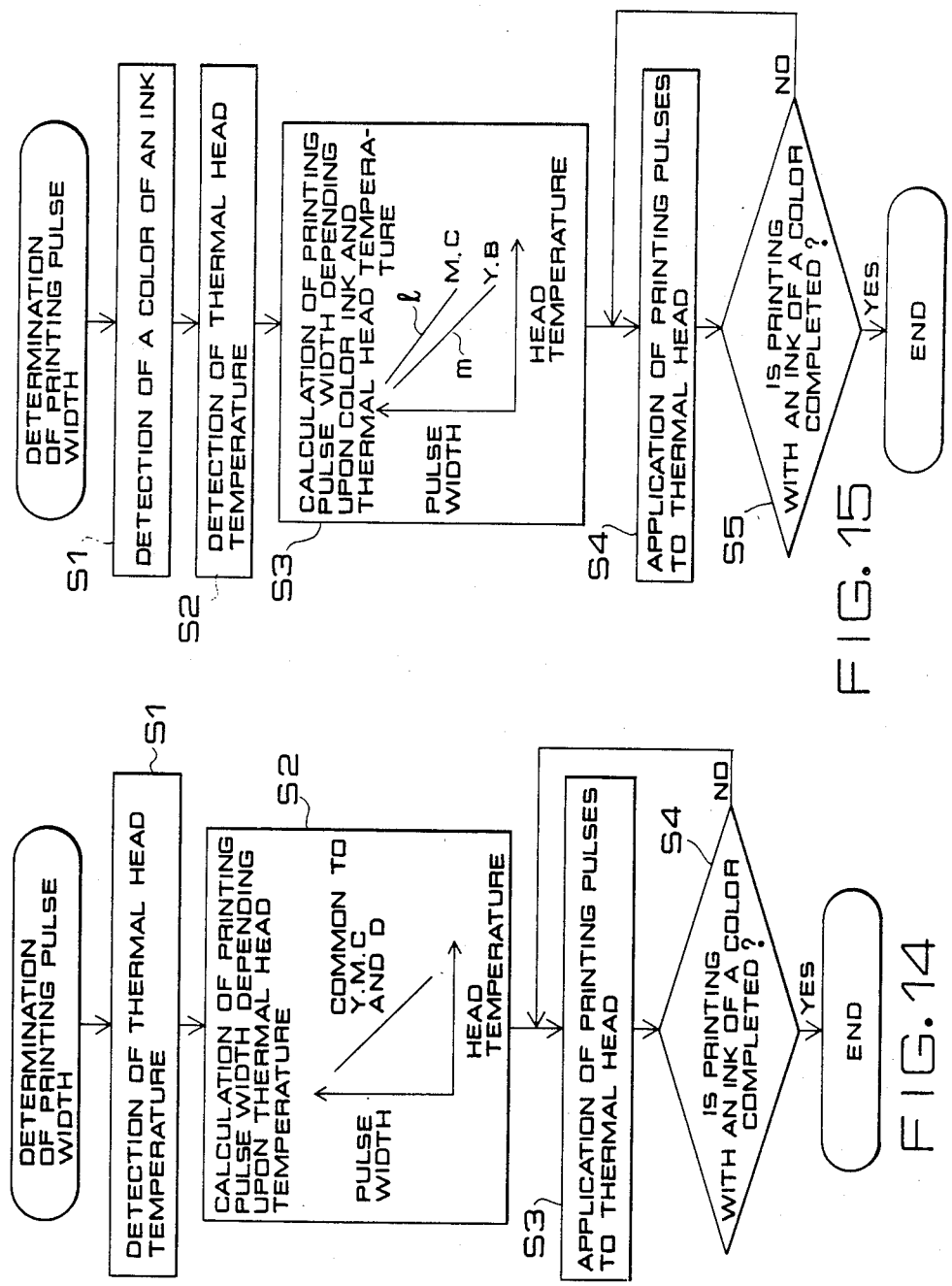

INK DONOR SHEET COLOR DETECTING DEVICE

BACKGROUND OF THE INVENTION

1. Field of the Invention

This invention relates to a device for detecting a color of an ink carrier for use with a thermal transfer recording device.

2. Description of the Prior Art

In a thermal transfer recording device, an ink carrier to which thermally fusible or sublimable ink is applied, is contacted face to face at an ink layer thereof with record paper, and a thermal head is pressed against a face of the ink carrier opposite to the ink layer and is heated in accordance with a record pattern to transfer ink to the record paper to effect desired recording. This thermal transfer system is advantageous in that multi-color recording can be easily attained with an ink carrier to which at least three inks of different colors of yellow, magenta and cyan are sequentially and repeatedly applied. In this system, however, since the inks of the three colors are transferred one upon another to obtain a record and this is repeated for a required number of times, it is necessary to detect a color of ink in order to position the ink carrier to individual color positions for transport of the ink carrier.

A conventional ink carrier color detecting device of the type wherein an ink carrier having a construction as shown in FIG. 1 is used, is already known. Referring to FIG. 1, an ink carrier 1 carries thereon an ink layer 2 in which a set of inks of yellow Y, magenta M and cyan C are applied sequentially and repeatedly. In order to allow detection of a color of ink on the ink carrier 1, black band-formed marks are provided between adjacent ink areas of different colors of the ink layer 2. The marks 3 consist of a mark 3a extending over the entire width of the ink carrier 1 and located forwardly of each area of the first color, that is, yellow Y, which provides a reference for transfer of ink of the three colors, and marks 3b and 3c each extending over about two thirds of the width of the mark 3a and located forwardly of each, are of the second and third colors, that is, magenta M and cyan C, respectively. In the conventional device, a pair of optical detecting means are located adjacent opposite side edges of an ink carrier 1 and detect the length of each of the marks 3 in order to position a yellow Y ink area providing a reference for transfer when a mark having a length greater than the length of another mark for an ink area of magenta M or cyan C, that is, a mark for an ink area of yellow Y, is detected. Further, while yellow Y of the reference color is identified, magenta M and cyan C cannot be distinguished from each other from the marks 3b and 3c since the marks 3b and 3c for magenta M and cyan C are identical to each other, and hence the two colors are distinguished in accordance with the sequential order from the reference color. This device, however, has a drawback that if a detection error of a mark 3 should occur, a wrong color may possibly be selected for transfer, and therefore reliability of the device cannot be high. For example, if detection of a mark 3b for magenta M should fail, cyan C would be detected as the second color and hence transfer of cyan C would occur where transfer of magenta M must occur.

Another typical ink carrier color detecting device is disclosed in Japanese Laid-Open Patent No. 58-140266 and is constituted as illustrated in FIGS. 2 and 3. Referring to FIGS. 2 and 3, lamps 13 and phototransistors 14 are located adjacent opposite faces of an ink donor sheet 11 and in a line perpendicular to a plane of the ink donor sheet 11 with filters 12a, 12b and 12c corresponding to the colors of the inks interposed between the lamps 13 and the ink donor sheet 11. The collector of each of the phototransistors 14 is connected to an input of a comparator 16 via an amplifier 15. A predetermined fixed reference voltage is applied to the other input of the comparator 16 via a resistor 17. An output of the comparator 16 is inputted as a detected color signal to a logic circuit 18.

The comparator 16 is constructed to provide an output signal "1" when there is an input from the amplifier 15 depending upon a reference voltage thereto.

In this conventional device, three identical systems each including such a comparator 16 are provided, and for the three systems, the filters 12a, 12b and 12c of colors corresponding to the colors of the inks as well as the lamps 13 and the phototransistors 14 are arranged in juxtaposed relationship along a widthwise direction of the ink donor sheet 11. The filters include a red filter 12a, a green filter 12b and a blue filter 12c. FIG. 3 is a diagrammatic representation illustrating an arrangement of the colors on the ink donor sheet 11. The ink donor sheet 11 includes an ink carrier 11a in the form of a polyester film or the like, and ink 11b is applied in a widthwise direction to a surface of the ink carrier 11a. Here, the ink 11b is applied repeatedly in an order of yellow Y, magenta M, cyan C and black B.

The conventional ink donor sheet color detecting device is constructed as described above. Thus, in this device, making use of a characteristic that a portion of the ink donor sheet 11 of a particular color is not pervious to light of a color complementary to the particular color, light beams of three colors individually complementary to the colors of the ink donor sheet 11 are thrown onto the ink donor sheet 11 and light passing therethrough is detected to distinguish a color of the ink. For example, if the color of ink on a portion of the ink donor sheet 11 is cyan C, the lamp 13 for the circuit for which the red filter 12a are provided, emits red light which does not pass through the portion of the ink donor sheet 11 and hence the corresponding phototransistor 14 remains in an off condition so that the comparator 16 outputs a signal "0". Meanwhile, in the circuits for which the green filter 12b and the blue filter 12c are provided, the lamps 13 emit green light and blue light, respectively, which pass through the portion of the ink donor sheet 11 so that the corresponding phototransistors 14 are turned on. Outputs of the two phototransistors 14 are amplified by the amplifiers 15 connected thereto and are then inputted to the associated comparators 16 so that a signal "1" is outputted from each of the comparators 16. The output signals of the comparators 16 are inputted to the logic circuit 18, and the logic circuit 18 thus distinguishes depending upon the input signals thereto that the ink on the portion of the ink donor sheet 11 is now cyan C. As a result, a transfer device will select the color, cyan C, to thermally transfer the ink of the color onto a predetermined sheet of paper in accordance with a prescribed pattern.

However, the conventional device as described just above, requires three identical circuit systems and thus requires the individual elements from the lamp 13 to the comparator 16 for such three systems. Accordingly, the conventional device has a drawback that production costs are raised and a circuit construction therefor becomes complicated, resulting in deterioration in reliability of the device.

SUMMARY OF THE INVENTION

The present invention eliminates such drawbacks as described above by constituting an ink donor sheet color detecting device such that an ink donor sheet has markers provided at positions thereon corresponding to individual ink areas and differentiated from each other in shape or in length for individual colors while a judging means is provided for detecting the differentiated shape or length of a marker.

Further, the present invention eliminates such drawbacks as described above by constituting an ink donor sheet color detecting device such that marks corresponding to individual colors are selectively provided at a plurality of band-formed mark indicating portions provided along the length of an ink carrier while a judging means is provided for detecting a color of ink from results of detection of marks by mark detecting means located for the individual mark indicating portions of the ink carrier.

Further, the present invention proposes a print density controlling method which controls the pulse width or amplitude of an input pulse to be supplied to dot heat generating elements of a thermal head in accordance with the temperature of the thermal head and a color of an ink.

In addition, the present invention provides a device which includes a mark detecting means for detecting a mark provided on record paper and a warning means which operates when the mark detecting means does not detect the mark after the record paper has been fed reversely, whereby warning is given when record paper is not restored to a predetermined position because of jamming of the paper or the like.

BRIEF DESCRIPTION OF THE DRAWINGS

FIG. 1 is a diagrammatic representation showing a typical one of conventional ink carriers;

FIG. 2 is a circuit diagram showing a typical one of conventional ink donor sheet color detecting devices;

FIG. 3 is a diagrammatic representation showing a typical one of conventional ink donor sheets;

FIG. 11 is a time chart illustrating signals of the device of FIG. 10;

FIG. 12 is a diagrammatic representation illustrating another embodiment of an ink donor sheet;

FIG. 13 is a diagrammatic representation showing a typical one of conventional printing devices;

FIG. 14 is a flowchart illustrating an example of a print density controlling method for the printing device of FIG. 13;

FIG. 15 is a flowchart illustrating an embodiment of a print density controlling method according to the invention;

DETAILED DESCRIPTION OF THE PREFERRED EMBODIMENTS

Figure 4:
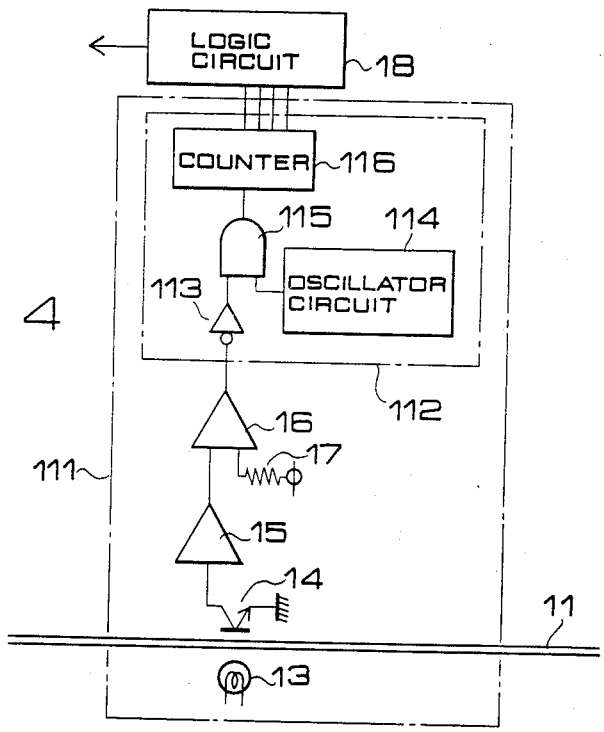
FIG. 4 is a circuit diagram illustrating an embodiment of an ink donor sheet color detecting device according to the present invention.
Figure 5:
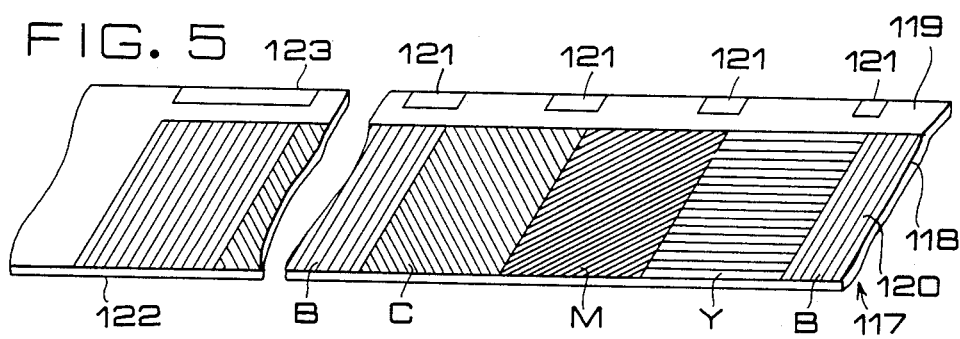
FIG. 5 is a diagrammatic representation illustrating an example of ink donor sheet which is used with the device of FIG. 4.

FIG. 4 is a circuit diagram illustrating an embodiment of an ink donor sheet color detecting device according to the present invention. Referring to FIG. 4, a marker shape judging section 111 includes a counter circuit 112 connected to a circuit identical to the circuit of the aforementioned conventional device including the elements from the lamp 13 to the comparator 16 for one system. An output signal of the counter circuit 112 is inputted to a logic circuit 18. The counter circuit 112 includes an inverter 113, a self-oscillator circuit 114, an AND gate 115 having both input terminals connected to output terminals of the inverter 113 and the self-oscillator 114, and a counter 116 having an input terminal connected to an output terminal of the AND gate 115. An output terminal of the comparator 16 is connected to an input terminal of the inverter 113 of the counter circuit 112. Meanwhile, the lamp 13 and the phototransistor 14 are located in a vertical line and in opposing relationship to a position of a marker indicating portion 119, which will be hereinafter described, of an ink donor sheet 117. The ink donor sheet 117 is constructed as illustrated in FIG. 5. Referring to FIG. 5, the marker indicating portion 119 is provided along one side edge on a surface of an ink carrier 118 in the form of a polyester film or the like. Ink 120 is applied to a mid portion other than the marker indicating portion 119 of the ink carrier 118 such that areas of inks of different colors are repeated in an order of yellow Y, magenta M, cyan C and black B. The marker indicating portion 119 of the ink donor sheet 117 has marks 121 applied thereto in black ink and located corresponding to individual color areas of the ink 120. The marks 121 extend in a direction of the length of the ink carrier 118, and each having a length determined for each of the colors. A marker 123 having a greater length than any other marker 121, is applied to the marker indicating portion 119 adjacent to a final end 122 of the ink donor sheet 117 which allows printing.

Figure 6:
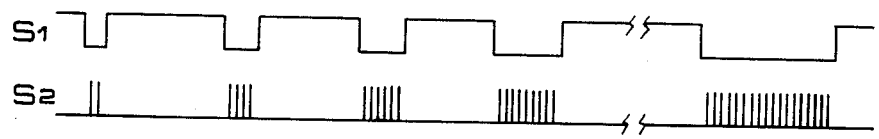
FIG. 6 is a time chart illustrating operations of the device of FIG. 4.

Operations of the device having such a construction as described just above will now be described with additional reference to FIG. 6. In FIG. 6, S1 illustrates an output signal of the comparator 16, and S2 illustrates an output signal of the AND gate 115. If a light beam from the lamp 13 is intercepted by a marker 121 while the mark indicating portion 119 of the ink donor sheet 117 moves between the lamp 13 and the phototransistor 14, the phototransistor 14 is turned off and hence the output signal S1 of the comparator 16 becomes "0". Here, since the ink donor sheet 117 moves at a fixed speed, the output signal S1 of the comparator 16 presents an output "0" which continues for a period of time corresponding to the length of a marker 121 for an area of a color of the ink 120. The output signal S1 is inverted into "1" by the inverter 113 and is inputted to the AND gate 115 together with an output pulse of the self-oscillator circuit 114. The AND gate 115 outputs the output pulse from the self-oscillator circuit 114 as an output signal S2 therefrom only while the input signal thereto from the inverter 113 is held "1". The counter 116 counts the number of pulses of the output signal S2 of the AND gate 115 and provides a resulted count to the logic circuit 18. The logic circuit 18 thus can distinguish the length of the marker 121 and hence the color of the area of the ink 120 depending upon the number of pulses counted. Meanwhile, since the marker 123 is longer than any other marker 121, the number of pulses of the output signal S2 corresponding to the marker 123 is the greatest, and hence the logic circuit 18 can distinguish the terminal end 122 of the ink donor sheet 117 which allows printing.

It is to be noted that while in the embodiment described above the markers 121 and 123 are formed from black ink applied, anything different may be employed instead if it intercepts light, and hence they may be formed from seals or the like adhered to the sheet. Otherwise, the markers 121 and 123 may be formed to reflect light, and in this case, the lamp 13 and the phototransistor 14 may be disposed on the same side relative to the sheet. Further, a light emitting diode may be used as a light source instead of the lamp 13 while a different light receiving element such as a CdS cell may be used instead of the phototransistor 14. In the meantime, while in the present embodiment, the counter circuit 112 is employed for the marker shape judging section 111, a timer circuit may be used in place of the counter circuit 112, or the output signal S1 of the comparator 16 may be directly inputted to the logic circuit 18 so as to distinguish the width of the output signal S1 by means of a software timer. Further, while in the present embodiment, the markers 121 have been described to be differentiated in length for the different colors of the inks, they may be differentiated otherwise in size or in shape. In short, it is sufficient if the markers are differentiated in any physical feature such as length so as to allow distinction of a color by detection of such a differentiated physical feature.

As apparent from the foregoing description, according to the ink donor sheet color detecting device of the present embodiment, an effect is attained that a highly reliable device can be obtained at a low cost, which can distinguish a color of an ink with a simple construction by constituting the device such that an ink donor sheet has markers provided at positions thereon corresponding to individual ink areas and differentiated from each other in shape or in length for individual colors while a judging means is provided for detecting the differentiated shape or length of a marker.

Figure 7:
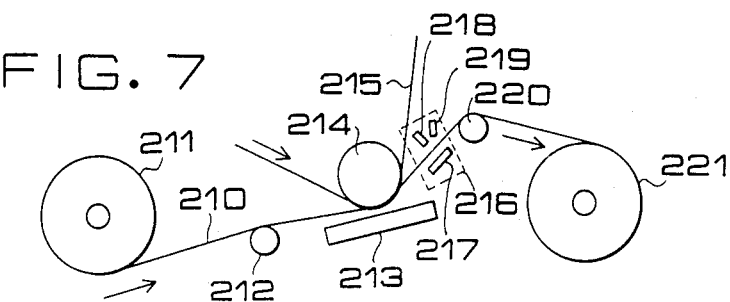
FIG. 7 is a diagrammatic representation of a thermal transfer recording device.
Figure 8:
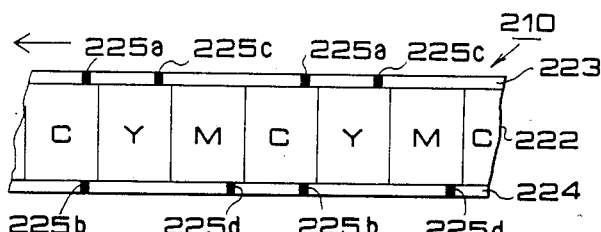
FIGS. 8 and 9 are diagrammatic representations illustrating an embodiment of an ink carrier according to the invention.
Figure 9:
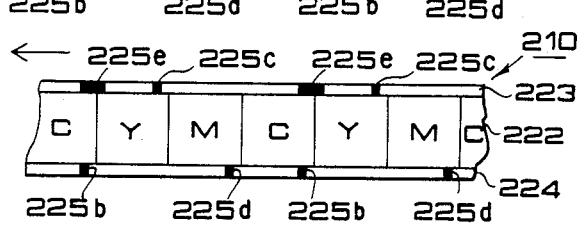

FIG. 7 is a diagrammatic representation illustrating a thermal transfer recording device employing an embodiment of an ink carrier color detecting device according to the present invention. Referring to FIG. 7, an ink carrier 210 is drawn out from a supply roll 211 and passes by a guide roller 212. The ink carrier 210 is then contacted under pressure with record paper 215 by a thermal head 213 and a platen roller 214 so as to effect transfer printing. After such transfer, the ink carrier 210 passes between a reflective plate 217 and a light source 218, and between the reflective plate 217 and a photo sensor 219, all constituting a mark detecting section 216, and then passes by a guide roller 220 whereafter it is wound up onto a takeup roll 221. The ink carrier 210 is constructed as illustrated in FIGS. 8 and 9. It is to be mentioned that the ink carrier 210 is fed in a leftward direction in these figures. The ink carrier 210 has an ink layer 222 applied to a surface of a polyester film or the like. The ink layer 222 has a repetition of areas of inks of three different colors including yellow Y, magenta M and cyan C, whose areas are each greater than an effective area for recording. The ink carrier 210 has, on opposite sides of the ink layer 222, a pair of transparent band-formed mark indicating portions 223 and 224 to which ink to be transferred is not applied. The mark indicating portions 223 and 224 have marks 225 indicated at positions corresponding to individual ink areas and spaced from each other in a direction of transportation of the ink carrier 210. The marks 225 are positioned such that, for each ink area of the first one of the three colors, that is, yellow Y, a mark 225a is indicated on the left-hand side mark indicating portion 223 as viewed from the transporting direction while another mark 225b is indicated on the opposite right-hand side mark indicating portion 224, and for each ink area of the second color of magenta M, a mark 225c is indicated on the mark indicating portion 223 while for each ink area of the third color of cyan C, a mark 225d is indicated on the mark indicating portion 224. It is to be noted that all the marks 225 are colored in black so as to absorb light such as infrared ray and have the same configuration having a length of 5 mm. In this manner, the marks 225 on the mark indicating portions 223 and 224 are regarded in pair to thus form a 2-bit digital code. FIG. 9 illustrates an arrangement of marks at a portion adjacent to a terminal end of the ink carrier 210. It is to be understood that the portion adjacent to the terminal end of the ink carrier 210 means here a range corresponding to five records from the terminal end of the ink carrier 210 where one record is defined by three ink areas of the colors of yellow Y, magenta M and cyan C. As seen in FIG. 9, of the left and right marks 225 for each of the ink areas of the first color, yellow Y, of the three colors, the mark 225e indicated on the mark indicating portion 223 is different in length from any other mark 225a to 225d. Here, the length of the marks 225e is 10 mm and hence twice of that of any other mark. The ink carrier color detecting device according to the invention will now be described with reference to FIG. 10. A mark detecting section 216 includes a left mark detecting section 216a and a right mark detecting section 216b located corresponding to the mark indicating portions 223 and 224, respectively, of the ink carrier 210. Each of the left and right mark detecting sections 216a and 216b includes a reflective plate 217a or 217b located on one side relative to the ink carrier 210 and constituted from a mirror, a white plate or the like for reflecting light such as infrared ray or the like, a light source 218a or 218b located on the other side and adapted to emit infrared ray or the like therefrom, and a photo sensor 219a or 219b also located on the other side and constituted from a phototransistor or the like for receiving reflected light from the reflective plate 217a or 217b. Outputs of the photosensors 219a and 219b are inputted via comparators 226 and 227 as detected mark signals A and B, respectively, to a microcomputer 228 which constitutes a judging means for judging a color of an ink. The comparators 226 and 227 are conditioned such that the detected mark signals A and B present an H (high) level when a mark 225 is detected. Meanwhile, the microcomputer 228 outputs, in response to the detected mark signals A and B, a transfer signal C to a picture image signalling circuit 229 for generating a transfer pattern to drive the thermal head 213 while it outputs a warning signal D to a warning lamp 230 for notifying that the terminal end of the ink carrier 210 comes near. The microcomputer 228 further controls, via a driver 231, a motor 232 for driving the takeup roll 221 for the ink carrier 210 and another motor 233 for driving the platen roller 214 to advance the record paper 215.

Figure 10:
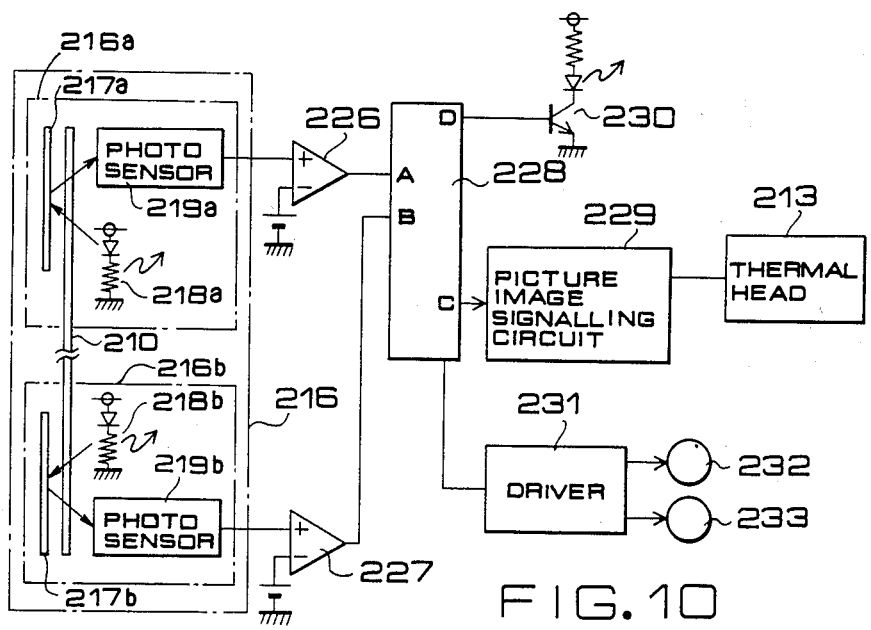
FIG. 10 is a block diagram illustrating an embodiment of an ink carrier color detecting device according to the invention.

Operations of the device having such a construction as described above will be described below with reference to a time chart of FIG. 11. At first, in order to position an ink area on the ink carrier 210 of the first color, yellow Y, which provides a reference to transfer from the ink carrier 210, the microcomputer 228 energizes the motor 233 to rotate the takeup roll 221 to transport the ink carrier 210. During transportation of the ink carrier 210, the left and right mark detecting sections 216a and 216b operate to detect a mark 225 indicated on the left and right mark indicating portions 223 and 224 of the ink carrier 210, and thus a signal A is outputted from the comparator 226 corresponding to the mark indicating portion 223, while another signal B is outputted from the comparator 227 corresponding to the mark indicating portion 224. Those signals A and B, as seen in FIG. 10, are inputted to the microcomputer 228. It is to be noted that t(Yi), t(Mi) and t(Ci) (i=1, 2, ...) in FIG. 11 indicate each a point of time at which a mark is detected. Here, since the marks 225 on the ink carrier 210 are indicated in such a manner as illustrated in FIG. 8, if the left and right mark detecting sections 216a and 216b detect marks 225a and 225b in pair for positioning an ink area of yellow Y, the signals A and B both of the H level are inputted to the microcomputer 228 at a point of time t(Y1). As a result, the microcomputer 228 recognizes appropriate positioning of the ink area of yellow Y and counts a duration of the H level of each of the signals A and B. As the signals A and B both become of an L (low) level to finish counting of the duration T1 of the H level, the microcomputer 228 determines from the duration T1 that the ink carrier 210 has not yet been fed to the portion adjacent to the terminal end thereof while it outputs a transfer signal C of the H level for effecting transfer of the first color, yellow Y. After completion of transfer of yellow Y, the motor 233 is driven reversely to return the record paper 215 to its initial position. Then the motor 232 is driven to rotate the takeup roll, and as a mark 225c corresponding to the second color, magenta M, is detected at a point of time t(M1), the color is determined now as magenta M due to the fact that only the signal B presents the H level, and as a result, transfer of the second color is effected in a similar manner to that described above. Transfer of the third color, cyan C, is then performed in a similar manner, thereby completing one record. Since the colors of individual ink areas can be detected from the marks 225 in this manner, accurate transfer of the ink can be attained with the present device. As such transferring operations are repeated in this manner until the ink carrier 210 comes near the portion adjacent to the terminal end thereof, only a mark 225e of the marks 225 on the ink carrier 210 which is indicated on the mark indicating portion 223 and corresponds to yellow Y, presents a length of 10 mm which is twice the length of any other mark. Accordingly, at a point of time t(Y3) at which yellow Y is to be detected for positioning thereof at the portion adjacent to the terminal end of the ink carrier 210, the microcomputer 228 receives the signal A of the H level having an ordinary duration T1 and the signal B of the H level having a duration T2 which is twice of the ordinary duration. Here, since the signals A and B both present the H level, the microcomputer 228 determines the color as the first color, yellow Y, while it compares the duration T2 of the signal B with the duration T1 of the signal A to determine that the ink carrier 210 is now near the portion adjacent to the terminal end thereof. The microcomputer 228 thus outputs a warning signal D to light the warning lamp 230. Then, transfer of the three colors is still performed in an ordinary manner, and yet since such marks 225e are assigned to ink areas for up to five records from the terminal end of the ink carrier 210, such transfer will not be interrupted, and thus the ink carrier 210 may be replaced after completion of transfer for a further few records. Besides, even if power is interrupted while the warning lamp 230 is lit and then the device is started again, since the same mark 225e is assigned to the next ink area of the first color, yellow Y, the warning lamp 230 will be lit again to notify without fail that the remaining amount of the ink carrier 210 is approaching zero. In this manner, according to the device of the present embodiment, the colors of ink areas can be detected certainly, and since they are detected in the form of digital codes, control by the microcomputer is facilitated, resulting in improvement in reliability. Moreover, by differentiation in length of the marks 225e on the portion adjacent to the terminal end of the ink carrier, an effect is provided that the remaining amount of the ink carrier can also be detected.

It is to be noted that while in the present embodiment a mark for detection of a portion adjacent to the terminal end of an ink carrier is longer than any other mark, any other means for differentiation of a mark for such detection may also be available, and for example, a mark for such detection may otherwise be shorter than any other mark. Further, while the marks are colored in black so as to absorb light, a similar effect may be attained if they may be otherwise colored or else formed from elements or a substance which reversely reflects light. Further, as illustrated in FIG. 12, an ink carrier 210 may otherwise have a pair of mark indicating portions 223 and 224 extending along opposite sides of ink areas and marks 225a to 225d as in the embodiment described above may be selectively applied to the mark indicating portions 223 and 224 in band-formed gaps 234 between ink areas to which ink for transfer is not applied.

As apparent from the foregoing description, according to the ink carrier color detecting device of the second embodiment of the present invention, marks are selectively provided for individual color ink areas in a plurality of band-formed mark indicating portions extending along the length of an ink carrier, and a judging means is provided for judging a color of an ink area from results of detection of a mark or marks by mark detecting sections provided individually for the mark indicating portions. Due to this construction, the ink carrier color detecting device presents an effect that the colors of ink areas can be detected certainly, resulting in improvement in reliability of the device.

A print density controlling method for a thermal transfer type color printing device, controlling means and method of the printing device is illustrated in FIGS. 13 and 14, respectively. Referring to FIG. 13, reference numeral 301 designates an ink donor sheet color detecting circuit, and 302 an ink donor sheet. The ink donor sheet 302 includes an ink carrier 302a in the form of a polyester film or the like, ink areas 302b of four colors applied to the ink carrier 302a, and markers 302c applied corresponding to the ink areas 302b. The four colors of the ink areas 302b include yellow Y, magenta M, cyan C and black B, and are arranged repeatedly in an order as just described. Reference numeral 303 designates a thermal head for performing thermal transfer. The thermal head 303 includes a shift register 303a, NAND elements 303b, dot heat generating elements 303c and a thermistor 303d for detecting the temperature of the thermal head 303. Reference numeral 304 denotes a microprocessor circuit for controlling the thermal head 303 in response to detection signals from the ink donor sheet color detecting circuit 301 and the thermistor 303d.

Operations of the device having such a construction as described just above will now be described with additional reference to a flowchart of FIG. 14. As the ink donor sheet color detecting circuit 301 detects a mark 302c on the ink donor sheet 302, the microprocessor circuit 304 determines the color of an ink to be printed subsequently and transmits printing data in the form of serial data corresponding to the ink color to the thermal head 303 by clocks. The serial data are stored into the shift register 303a of the thermal head 303, and those of the dot heat generating elements 303c which correspond to bits "1" of the serial data, are energized to generate heat for a period of time corresponding to the width of a printing pulse determined by the microprocessor circuit 304. Heat thus generated, melts the ink 302b on the ink donor sheet 302 so that the ink 302b is transferred to print paper which is closely contacted with the ink donor sheet 302 by a platen roller not shown. Determination of the width of a printing pulse is effected as illustrated in the flowchart of FIG. 14. At step 1, the microprocessor circuit 304 detects the temperature of the thermal head 303 by means of the thermistor 303d on the thermal head 303. Then at step 2, the width of a print pulse corresponding to the detected temperature is calculated and determined from a predetermined thermal head temperature-printing pulse width characteristics. After determination of the printing pulse width, at steps 3 and 4, printing pulses of the same width are applied to the thermal head 303 until printing for an ink color is completed.

The conventional print density controlling operation of the printing device includes such steps as described just above and controls depending upon the thermal head temperature-printing pulse width characteristics such that, when the temperature is low, the printing pulse width is increased to increase heat generation of the dot heat generating elements and when the temperature is high, the printing pulse width is decreased to reduce heat generation so as to attain an appropriate printing density. However, according to the conventional device, the thermal head temperature-printing pulse width characteristic is identical for all of ink colors, and characteristics of individual color inks, especially viscosity of pigments and so on, are not taken into consideration. Accordingly, the conventional device has a drawback that, in case of some color ink, for example, ink 302b when printed, may become blurred because heat generation is not sufficient for the viscosity of the ink, or to the contrary, printing may be too dense because heat generation is excessive for the viscosity. Further, in case of a color ink which includes a pigment or pigments having a high viscosity as a principal component or components, there is a drawback that an uncomfortable noise may be produced when the ink 302b after transfer is exfoliated from the ink carrier 302a.

FIG. 15 is a flowchart illustrating an embodiment of a print density controlling device according to the present invention. For this device, the printing device of FIG. 13 may be used. The controlling device of the present embodiment will be described below with particular reference to the flowchart of FIG. 15. At step 1, the microprocessor circuit 304 detects the color of an ink area on the ink donor sheet 302 by means of the ink donor sheet color detecting circuit 301, and then at step 2, it detects the temperature of the thermal head 303 by means of the thermistor 303d on the thermal head 303. Then at step 3, the widths of print pulses corresponding to the ink color and thermal head temperature detected at steps 1 and 2, respectively, are calculated and determined from thermal head temperature-printing pulse width characteristics l and m which are different from each other for predetermined different ink colors. After determination of the printing pulse widths, at steps 4 and 5, printing pulses of the same width are applied to the thermal head 303 until printing for an ink color is completed. Thus, according to the present embodiment, since the widths of printing pulses are determined in accordance with the thermal head temperature-printing pulse width characteristics which are different from each other depending upon the characteristics of the color inks, in case of a color ink having, for example, a high viscosity, heat generation of the dot heat generating elements 303c of the thermal head 303 is increased depending upon the characteristic thereof providing a large pulse width, and on the contrary in case of a color ink having a low viscosity, heat generation is decreased. By this device, any ink when printed, will neither become blurred nor be too dense, and no uncomfortable noise will be produced.

Figure 16:
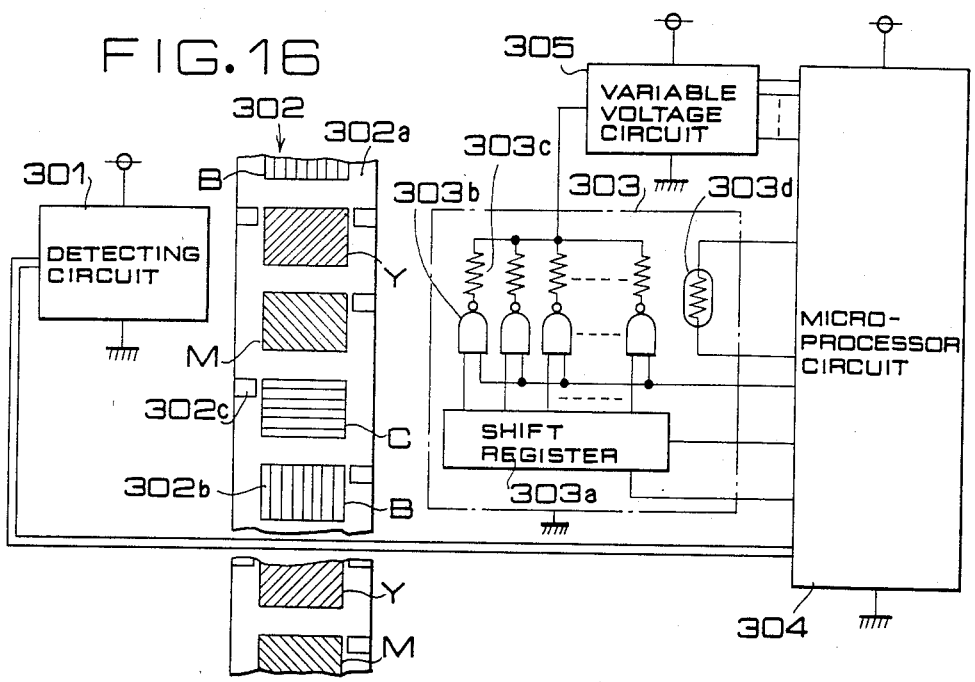
FIG. 16 is a diagrammatic representation of an embodiment of a printing device according to the invention.
Figure 17:
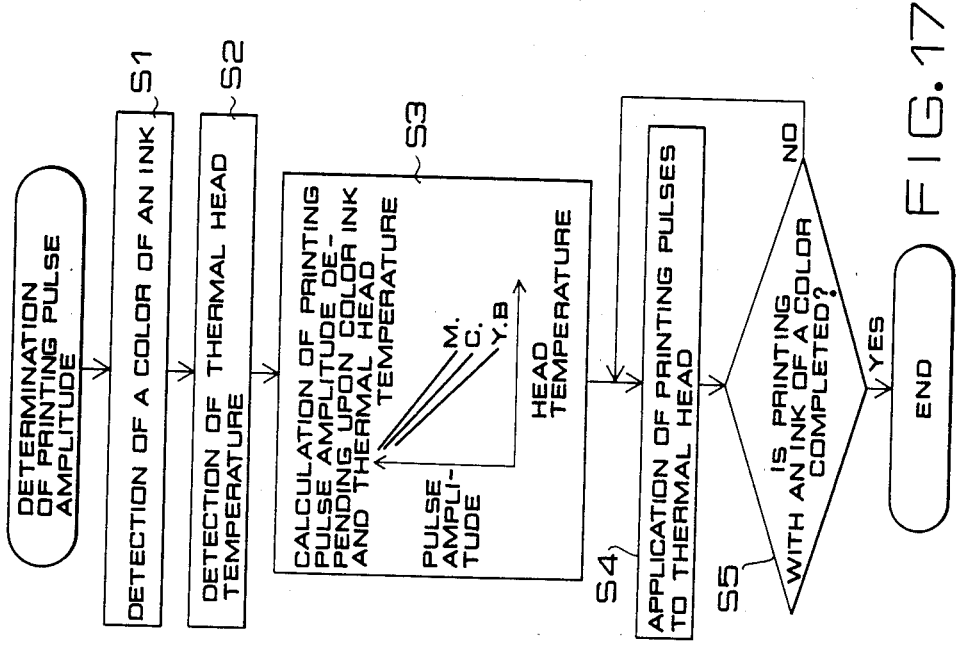
FIG. 17 is a flowchart of another embodiment of a print density controlling method according to the invention.

It is to be noted that while in the embodiment described above the pulse width of a printing pulse is controlled, the amplitude of printing pulses may otherwise be controlled as illustrated in FIGS. 16 and 17. FIG. 16 illustrates a construction of a printing device similar to that of FIG. 13, and the like or elements are designated by like reference numerals and description thereof is omitted herein. Referring to FIG. 16, a variable voltage circuit 305 is connected to the microprocessor circuit 304 and has an output connected to the dot heat generating elements 303c of the thermal head 303. FIG. 17 is a flowchart illustrating the present controlling device, and steps in the flowchart other than step 3 are identical to those of the embodiment of the flowchart of FIG. 15. Thus, at step 3, the microprocessor circuit 304 calculates and determines, from thermal head temperature-printing pulse width characteristics which are different from one another for predetermined different ink colors, widths of printing pulses corresponding to the ink color and thermal head temperature. Thus, the microprocessor circuit 304 controls the variable voltage circuit 305 to vary a supply voltage to determine the printing pulse amplitude. Accordingly, the dot heat generating elements 303d of the thermal head 303 are energized by an electric current corresponding to the printing pulse width so that heat generation is controlled.

It is to be noted that while in the embodiments described above the printing pulse width or amplitude is identical within a period of time for printing with a color ink, the thermal head temperature may otherwise be detected after each printing of a line so that the printing pulse width or amplitude may be recalculated in accordance with results of such detection. By this construction, control of the printing density can be effected more accurately.

Further, while the embodiments described above employ inks of four different colors, it is naturally possible to employ any other number of color inks other than four.

As apparent from the foregoing description, according to the print density controlling device for a printing device according to the third embodiment of the present invention, the size such as the pulse width or amplitude of input pulses supplied to dot heat generating elements of a thermal head are controlled depending upon the temperature of the thermal head and the type of color ink. Accordingly, the present controlling device provides an effect that appropriate print density can be attained with all characteristics of the color ink and no uncomfortable exfoliating noise will be produced.

Meanwhile, in a printing device, for example, in a thermal transfer printing device, an ink carrier to which thermally transferrable (thermally fusible or thermally sublimable) ink is applied, is contacted at an ink applied face thereof with record paper and heat is selectively supplied to the ink carrier from the other face thereof by means of a thermal head to allow the thus fused or sublimed ink to be transferred to the record paper to attain recording of information. When multi-color printing is to be effected with this method, as can be seen, for example, in a color hard copy device CHC-33 produced by Shinko Electric Co., Ltd., an ink carrier is used to which mono-color ink layers for at least two different colors are applied in a row along the length of the ink carrier, and record paper and the ink carrier are transported while they are contacted under pressure with each other by means of a platen roller and a thermal head in order to effect transfer of ink of the first color. When transfer for the second or any succeeding color is to be effected, the record paper is returned to the position at which the transfer for the first color has been initiated in order to allow overlapping transfer of different inks. Any succeeding transfer is thus effected after the record paper has been returned to the initial position. Accordingly, the record paper is moved back and forth a plurality of times in a paper feed direction.

Accordingly, if the record paper is not transported in a direction perpendicular to the center axis of a platen roller by some reasons or if record paper during back and forth movement is caught at a portion of a transporation path, the record paper may sometimes fall in a jammed condition near the platen roller. Even if it is tried to continue printing with this condition left as it is, normal operations cannot be attained, and since a paper feed motor will try to feed the record paper while in the jammed condition or since a thermal head will receive a heat generating signal, a burden will be imposed on the paper feed motor or the thermal head, which may cause a trouble or may have a bad influence on the life of the device or the like. Even if the record paper may not be bought into a jammed condition, it cannot be sure that the record paper is certainly returned to its initial position at which printing for the first color was initiated, and hence deterioration of print quality such as color deviation will result.

Figure 18:
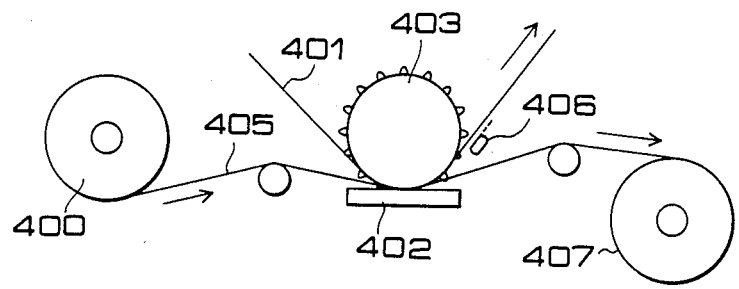
FIG. 18 is a diagrammatic representation of a further embodiment of a printing device according to the invention.

Now, an embodiment which eliminates this drawback will be described. FIG. 18 is a diagrammatic representation illustrating a printing device, especially a thermal transfer printing device, according to a further embodiment of the invention. Referring to FIG. 18, record paper 401 is contacted under pressure with an ink carrier 405 supplied from an ink carrier supply reel 400 by means of a thermal head 402 and a platen roller 403. Provided adjacent to a position at which the record paper 401 is discharged from the platen roller 403, is an optical mark detecting section 406 such as a photo reflector or the like. The ink carrier 405 after transfer is taken up onto an ink carrier takeup reel 407.

Figure 19:
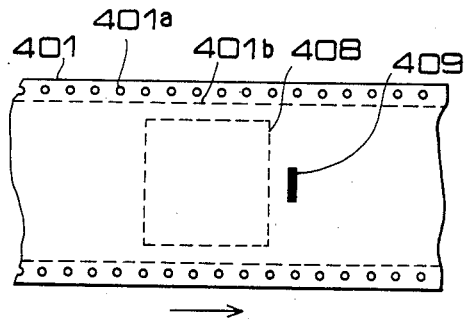
FIG. 19 is a diagrammatic representation showing locations of positioning marks applied to record paper which is used with the embodiment of FIG. 18.

As shown in FIG. 19, the record paper 401 is in the form of a continuous web on which portions 408 to receive recording, are successively provided. The record paper 401 has a pair of rows of guide holes 401a and a pair of perforated lines 401b formed along opposite side edges thereof, and has a mark provided at a position directly and forwardly of each of such portions 408 in a paper feeding direction. The mark 409 may be colored in black or the like so that it may absorb light emitted from a light source of the mark detecting section 406.

Figure 20:
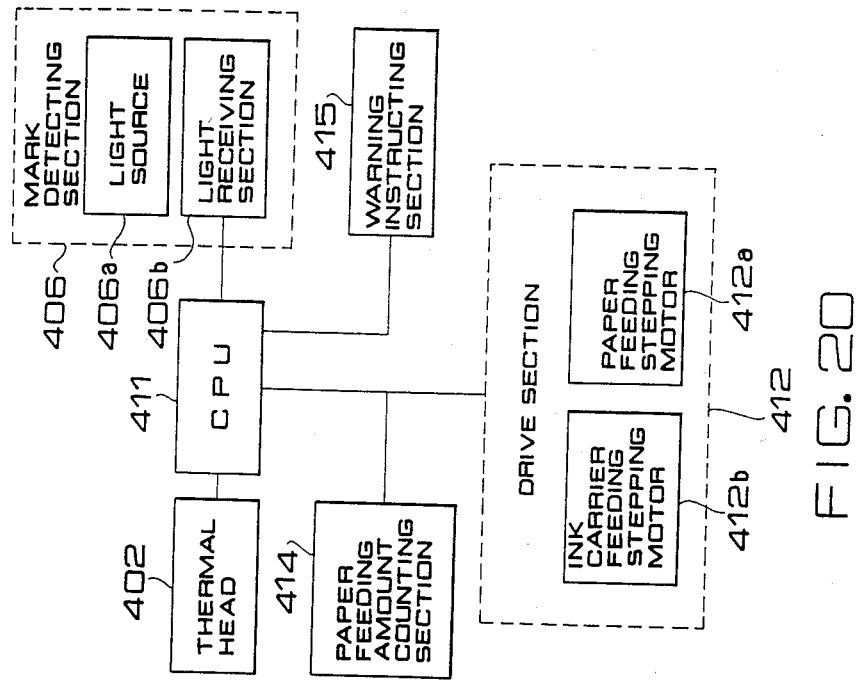
FIG. 20 is a schematic block diagram illustrating a controlling circuit of the embodiment of FIG. 19.

FIG. 20 illustrates a schematic block diagram illustrating a control system of the printing device of the present invention. Referring to FIG. 20, the mark detecting section 406 for detecting a mark 409 provided on record paper 401 includes a light source 406a which emits light such as an infrared ray, and a light receiving section 406b which detects light emitted from the light source 406a and reflected from the record paper 401. A CPU (central processing unit) 411 monitors a condition of the record paper by way of the mark detecting section 406 while it accomplishes a series of controls to drive a paper feeding stepping motor 412a and an ink carrier feeding stepping motor 412b which both constitute a drive section 412 and to effect recording with the thermal head 402. The paper feeding stepping motor 412a and the ink carrier feeding stepping motor 412b act to drive the platen roller 403 and the ink carrier takeup reel 407 of FIG. 18, respectively. A distance over which the record paper 401 is fed, is determined by the number of pulses delivered to the paper feeding stepping motor 412a, and a paper feed amount calculating section 414 is provided to count such pulses to distinguish the paper feed amount or distance. There is also provided a warning instructing section 415 for notifying that the device is in an error condition such as paper jamming.

Now, description will be given of operations of the printing device according to the embodiment of the present invention.

The recording paper 401 inserted from a paper inlet in such a manner as to be put between the platen roller 403 and the ink carrier 405 is transported by the platen roller 403 until it is stopped and positioned for preparation for subsequent printing at a position at which a mark 409 provided on the record paper 401 is detected by the mark detecting section 406.

A procedure for detecting a mark 409 will proceed as follows. When there is no mark 409 of the record paper 401 at a position of the mark detecting section 406, a beam of light such as infrared ray emitted from the light source 406a of the mark detecting secton 406 is reflected by the record paper 401 and is detected by the light receiving section 406b. Consequently, the CPU 411 judges that there is no mark 409 at the position of the mark detecting section 406 as reflected light is detected at the light receiving section 406b. If a mark 409 of the record paper 401 comes to the position of the mark detecting section 406, a light beam such as infrared ray emitted from the light source 406a of the mark detecting section 406 is absorbed by the mark 409, and hence no or little reflected light is detected at the light receiving section 406b. Consequently, the CPU 411 judges that there is a mark 409 at the position of the mark detecting section 406 when reflected light is not detected at the light receiving section 406b.

If a mark 409 is detected in this manner at the position of the mark detecting section 406, the CPU 411 controls the paper feeding stepping motor 412a of the drive section 412 to stop the record paper 401. Simultaneously, the CPU 411 controls the ink carrier feeding stepping motor 412b to transport the ink carrier 405 to a position to allow printing for the first color, thereby completing preparations for subsequent printing.

After initiation of printing, the record paper 401 and the ink carrier 405 are transported, under control of the CPU 411, at the same speed by the paper feeding stepping motor 412a and the ink carrier feeding stepping motor 412b, respectively, while they are held contacted under pressure with each other by the thermal head 402 and the platen roller 403. In the meantime, thermally transferrable (thermally fusible, thermally sublimable or the like) ink on the ink carrier 405 is transferred to the record paper 401 due to heat pulses selectively applied thereto from the thermal head 402 controlled by the CPU 411, thereby completing printing for the first color. The amount or distance of the record paper 401 fed for printing is measured or counted at the paper feed amount counting section 414 from the number of pulses delivered to the paper feeding stepping motor 412a.

Then, before initiation of printing for the second color, the CPU 411 controls the ink carrier feeding stepping motor 412b to transport the ink carrier 405 to a position to allow printing for the second color while it controls the paper feeding stepping motor 412a to rotate in the reverse direction to feed the record paper 401 reversely by a distance equal to the distance which was counted at the paper feed amount counting section 414 while the record paper 401 was fed for printing for the first color, thereby returning the record paper 401 to an initial position from which printing for the first color was started. Thus, since the mark 409 for positioning must be again at the position of the mark detecting section 406 if the record paper 401 is properly back in its initial position and is in a regular condition, if the CPU 411 confirms this by means of the mark detecting section 406, it judges that the record paper 401 has been returned properly, and it completes preparations for and starts printing for the second color. In case of a system wherein the ink carrier 405 has inks of m different color (M≧2) applied thereto for printing of a picture, printing is performed m times in a similar procedure, and then a portion of the record paper 401 on which the intended picture is completely printed, is discharged to make preparations for printing of the next picture.

Here, if the record paper 401 is not returned appropriately to a position at which printing for the n−1th color was started (that is, the position at which printing for the first color was started) by some reasons such as jamming of the record paper 401 when the record paper 401 has been fed reversely for preparations for printing for the nth color (2≦n≦m) after completion of printing for the n−1th color, that is, when the paper feeding stepping motor 412a has been rotated reversely by the amount which was counted at the paper feeding amount counting section 414 for printing for the n−1th color, then the mark 409 on the record paper 401 is not positioned at the position of the mark detecting section 406. Thus, in case the CPU 411 confirms that there is no mark 409 at the position of the mark detecting section 406 after the paper feeding stepping motor 412a has been rotated reversely by the amount which was counted at the paper feeding amount counting section 414, the CPU 411 judges that the record paper 401 has not been returned appropriately and thus stops control of the driving section 412 and the thermal head 402 while it notifies an operator of it by means of alarming or lighting of a warning lamp with the warning instructing section 415. The operator who perceived the emergency from the warning by the warning instructing section 415 can thus remove the record paper in such jammed condition and correct the record paper 401 in position.

It is to be noted that while in the present embodiment marks 409 are located in the center of the width of the record paper 401, they may otherwise be dislocated leftwardly or rightwardly in the widthwise direction to a position only if it corresponds to a position to which the mark detecting section 406 can be physically mounted. In this manner, according to the present embodiment, a transporting condition of record paper can be detected making use of a mark for positioning of the record paper to a position for starting of printing, which is effective to prevent deterioration of print quality due to irregular transportation of the record paper and to prevent a bad influence on the system due to an overload to the drive section or the like. Further, since the detecting means for positioning the record paper serves also as means for detecting extraordinary transportation of the record paper, functioning of the device can be improved without complicated construction of the device and without rise of costs.

As apparent from the foregoing description, according to the fourth embodiment of the present invention, record paper has a mark provided thereon, and when detecting means for detecting this mark does not detect the mark upon returning of the record paper, warning is provided from the device. Accordingly, reliability for printing can be improved thereby.

What is claimed is:

1. An ink donor sheet color detecting device wherein an ink donor sheet, on which a plurality of inks of different colors are disposed, is contacted with record paper and ink is transferred to said record paper by means of a printing head to effect recording, comprising:

said ink donor sheet having a mark indicating portion on which marks having different shapes or lengths corresponding to said colors of said ink disposed on said ink donor sheet are provided at positions corresponding to areas of said color inks;

a mark detecting section located at a position corresponding to said mark indicating portion of said ink donor sheet for detecting a mark on said indicating portion;

a judging means for receiving a signal representative of results of detection of a mark from said mark detecting section to judge said color of said ink corresponding to said mark;

said printing head being constituted from a thermal head having dot heat generating elements for receiving an input pulse thereto to generate heat for transferring ink for said individual colors of said ink donor sheet, said color detecting device further comprising a temperature detector for detecting the temperature of said thermal head; and control means for receiving a signal from said temperature detector and another signal representative of a color from said judging means to control the size of an input pulse supplied to said dot heat generating elements depending upon the temperature of said thermal head and the color of the ink.

2. An ink donor sheet color detecting device according to claim 1, wherein said ink donor sheet is formed from a band-formed member having areas of said plurality of inks of said different colors applied thereto along the length thereof, and said mark indicating portion of said ink donor sheet has said marks located at positions corresponding to said areas of said plurality of different color inks along the length of said band-formed sheet.

3. An ink donor sheet color detecting device according to claim 2, wherein said mark indicating portion is provided on a margin which is formed along an edge along the length of said ink donor sheet.

4. An ink donor sheet color detecting device according to claim 3, wherein said mark indicating portion has, at a portion at or adjacent to a terminal end of said ink donor sheet, a mark which represents that said ink donor sheet has been used up to said terminal end thereof or to said portion adjacent to said terminal end thereof.

5. An ink donor sheet color detecting device according to claim 3, wherein said margin is provided along one of opposite side edges along the length of said ink donor sheet.

6. An ink donor sheet color detecting device according to claim 3, wherein said margin is provided along each of opposite side edges along the length of said ink donor sheet.

7. An ink donor sheet color detecting device according to claim 3, wherein said marks on said mark indicating portion of said ink donor sheet are different in length for said colors of said inks to indicate said colors of said plurality of inks and are provided corresponding to said areas of said inks.

8. An ink donor sheet color detecting device according to claim 3, wherein said mark indicating portion of said ink donor sheet has a plurality of mark indicating parts for indicating said plurality of color inks whereby the color of an ink area is represented by whether a mark indicating part includes a mark corresponding to said ink area.

9. An ink donor sheet color detecting device according to claim 1, wherein said mark detecting section is constituted from means for optically detecting a mark, said means including a light emitting section for emitting light and a light receiving section for receiving light from said light emitting section passing through said mark indicating portion of said ink donor sheet to distinguish a mark.

10. A ink donor sheet color detecting device according to claim 1, wherein said judging means judges a color of the ink from the length of a time over which said mark detecting section continues to detect a mark.

11. An ink donor sheet color detecting device according to claim 1, wherein said judging means judges a color of the ink from a signal received from said mark detecting section and representative of presence or absence of a mark on said mark indicating portion.

12. An ink donor sheet color detecting device according to claim 1, wherein said control means controls an input pulse in accordance with any of predetermined thermal head temperature vs input pulse characteristics which are different for said colors of said inks.

13. An ink donor sheet color detecting device according to claim 1, wherein said control means controls an input pulse such that, in case of an ink having a high viscosity, heat generation of said thermal head is increased, and on the contrary in case of an ink having a low viscosity, heat generation of said thermal head is decreased.

14. An ink donor sheet color detecting device according to claim 12, wherein said control means controls heat generation of said thermal head by increasing or decreasing the pulse width of said input pulse.

15. An ink donor sheet color detecting device according to claim 1, wherein said control means controls heat generation of said thermal head by increasing or decreasing the pulse amplitude of said input pulse.

16. An ink donor sheet color detecting device according to claim 1, wherein said apparatus is a printing apparatus wherein, after printing for a predetermined color as record paper is fed in a fixed direction, the record paper is fed reversely by an amount over which the record paper has been fed during printing for the predetermined color whereafter printing for another color is effected again, and a mark is provided at a predetermined location of said record paper such that said mark detecting section may detect the position of said mark, and further comprising control means for operating a warning means when said mark is not detected by said mark detecting section after said record paper has been fed reversely.

* * * * *